(12) United States Patent
Fornander et al.

(10) Patent No.: US 11,940,777 B2
(45) Date of Patent: Mar. 26, 2024

(54) SENSOR CONTROL ASSEMBLY AND MANUFACTURING DEVICE

(71) Applicant: Siemens Energy Global GmbH & Co. KG, Bayern (DE)

(72) Inventors: Jerry Fornander, Finspang (SE); Andreas Graichen, Norrköping (SE); Thomas Jetzfellner, Aschheim (DE); Johan Lindstam, Norrköping (SE); Markus Sauer, Munich (DE); Monika Sturm, Vienna (AT)

(73) Assignee: Siemens Energy Global GmbH & Co. KG, Bayern (DE)

( * ) Notice: Subject to any disclaimer, the term of this patent is extended or adjusted under 35 U.S.C. 154(b) by 446 days.

(21) Appl. No.: 17/274,178

(22) PCT Filed: Sep. 16, 2019

(86) PCT No.: PCT/EP2019/074703
§ 371 (c)(1),
(2) Date: Mar. 7, 2021

(87) PCT Pub. No.: WO2020/058191
PCT Pub. Date: Mar. 26, 2020

(65) Prior Publication Data
US 2021/0200191 A1    Jul. 1, 2021

(30) Foreign Application Priority Data

Sep. 18, 2018 (EP) .................................. 18195202

(51) Int. Cl.
*G05B 19/41*    (2006.01)
*G05B 19/418*    (2006.01)
(Continued)

(52) U.S. Cl.
CPC ... *G05B 19/4183* (2013.01); *G05B 19/41805* (2013.01); *H04L 9/0643* (2013.01);
(Continued)

(58) Field of Classification Search
CPC .......... G05B 19/4183; G05B 19/41805; H04L 9/0643; H04L 9/3236; H04L 67/12;
(Continued)

(56) References Cited

U.S. PATENT DOCUMENTS

| | | |
|---|---|---|
| 2013/0258953 A1 | 10/2013 | Huang |
| 2014/0301550 A1 | 10/2014 | Lewis |

(Continued)

FOREIGN PATENT DOCUMENTS

| | | |
|---|---|---|
| CN | 104104510 A | 10/2014 |
| CN | 104205675 A | 12/2014 |

(Continued)

OTHER PUBLICATIONS

Trouton Stuart et al: 3D opportunity for blockchain, XP055539847, Retrieved from the Internet: URL:https://www2.deloitte.com/content/dam/ insights/us/articles/3255 3D-opportunity blockchain/DUP 3D-opportunTty blockchain.pdf; [retrieved on Jan. 9, 2019], pp. 9, left-hand column, line 18—right-hand column, line 12; 2016.

(Continued)

*Primary Examiner* — Michael J Brown
(74) *Attorney, Agent, or Firm* — Wolter Van Dyke Davis, PLLC (57) ABSTRACT

A sensor control assembly and method providing a secured sensor data and an optimized handling of the sensor including a sensor, a first processing unit adapted to provide a cryptographic checksum of sensor data, a distributed database, a second processing unit adapted to verify the sensor data, and a third processing unit adapted to determine the (Continued)

demand for calibration. A manufacturing device contains at least a part of the sensor control assembly.

16 Claims, 1 Drawing Sheet

(51) Int. Cl.
*H04L 9/06* (2006.01)
*H04L 9/32* (2006.01)
*H04L 67/12* (2022.01)
*B33Y 50/02* (2015.01)
*G06F 21/64* (2013.01)
*H04L 9/00* (2022.01)

(52) U.S. Cl.
CPC ............ *H04L 9/3236* (2013.01); *H04L 67/12* (2013.01); *H04L 9/50* (2022.05)

(58) Field of Classification Search
CPC ........... H04L 9/50; B29C 64/00; B33Y 50/02; G06F 21/64; G06F 21/602
USPC .......................................................... 700/95
See application file for complete search history.

(56) References Cited

U.S. PATENT DOCUMENTS

| | | | | |
|---|---|---|---|---|
| 2015/0254463 | A1* | 9/2015 | Ryhorchuk | H04L 9/3247 713/176 |
| 2018/0239339 | A1* | 8/2018 | Inagaki | G05B 19/4184 |
| 2018/0314606 | A1 | 11/2018 | Bronk | |
| 2018/0343307 | A1* | 11/2018 | Lotter | G06Q 50/188 |
| 2019/0037012 | A1 | 1/2019 | Stöcker | |
| 2019/0089716 | A1 | 3/2019 | Stöcker | |
| 2019/0236300 | A1 | 8/2019 | Guo | |
| 2020/0298496 | A1* | 9/2020 | Puigardeu Aramendia | B22F 10/14 |

FOREIGN PATENT DOCUMENTS

| | | |
|---|---|---|
| CN | 106960128 A | 7/2017 |
| CN | 107086914 A | 8/2017 |
| CN | 107124278 A | 9/2017 |
| CN | 107942718 A | 4/2018 |
| CN | 108292250 A | 7/2018 |
| FR | 2972274 A1 | 9/2012 |
| WO | 2012073233 A1 | 6/2012 |
| WO | 2017167399 A1 | 10/2017 |
| WO | 2017198291 A1 | 11/2017 |

OTHER PUBLICATIONS

PCT International Search Report and Written Opinion of International Searching Authority dated Nov. 22, 2019 corresponding to PCT International Application No. PCT/EP2019/074703 filed Sep. 16, 2019.

Wang, Jingyu et al., "Low-Power Single-Ended SAR ADC Using Symmetrical DAC Switching for Image Sensors With Passive CDS and PGA Technique", IEEE Transactions on Circuits and Systems-I: Regular Papers 2018.

Jia, Zongpu et al. "Energy-saving privacy preserving aggregation scheme with integrity verification support", Computer Engineering Applications; 53 5); College of Computer Science and Technology, Henan University of Science and Technology, China; 2017 [English abstract on p. 1].

* cited by examiner

SENSOR CONTROL ASSEMBLY AND MANUFACTURING DEVICE

CROSS REFERENCE TO RELATED APPLICATIONS

This application is the US National Stage of International Application No. PCT/EP2019/074703 filed 16 Sep. 2019, and claims the benefit thereof. The International Application claims the benefit of European Application No. EP18195202 filed 18 Sep. 2018. All of the applications are incorporated by reference herein in their entirety.

FIELD OF INVENTION

The invention refers to a sensor control assembly providing a secured sensor data and an optimized handling of the sensor. Furthermore, the invention refers to a sensor unit to be used in such sensor control assembly. Furthermore, the invention refers to a manufacturing device containing at least a part of the sensor control assembly. Furthermore, the invention refers to a method to optimize the utilization of a sensor.

BACKGROUND OF INVENTION

Semiautomatic or automatic manufacturing devices are widely used in industrial manufacturing and are continuously the topic of further developments. New methods of manufacturing like additive manufacturing provide great opportunities, however, simultaneously provide new challenges to transfer such methods from research topics to reliable and universal applicable manufacturing devices.

For example, manufacturing methods like additive manufacturing provide the possibility to flexibly adapt the manufacturing to present needs and switch between different products with almost no or no time loss. This allows to bundle such production at central locations, wherein orders are, for example, bundled globally and split up to be produced by the facility just having free capacities. Also such method might not be strictly internally, but could also be used for some external contract worker providing such additive manufacturing capabilities. However, despite the general universal applicability of such processes several problems arise. Minor differences in the controls or deviations from the standards based on, for example, replaced spare parts result in decrease in product quality deemed to be not acceptable to high quality products like being used in streaming engines. Also producing parts flexibly on any manufacturing device simply based on the availability of the device may result in further problems.

For example, moving the production to a different manufacturing location meeting the requirements and demands provides further problems. Like to ensure that the required conditions have been met during manufacturing while relying on data collected not by the costumer, but the producer instructed accordingly. Herein, providing reliable sensor data also for long usage provides special challenges. For example, as the required data can later become topic of disputes the reliability of the sensor data has to be guaranteed being especially challenging. Herein, not only intentional manipulation of the sensor data can cause problems, but also problems like a sensor losing its calibration over time.

Therefore, there is a need to provide means solving such problems to enable the usage of new methods as flexible and beneficial as they claim to be.

SUMMARY OF INVENTION

These problems are solved by the products and methods as disclosed hereafter and in the claims. Further beneficial embodiments are disclosed in the dependent claims and the further description. These benefits can be used to adapt the corresponding solution to specific needs or to solve further problems.

According to an aspect the invention refers to a sensor control assembly to securely verify and calibrate a sensor of a manufacturing device utilized in a manufacturing process of a product, containing—a sensor of a manufacturing device,—a first processing unit adapted to provide a cryptographic checksum of sensor data acquired by the sensor,—a distributed database adapted to receive the sensor data, wherein the distributed database is protected against manipulation,—a second processing unit adapted to verify the sensor data based on the cryptographic checksum,—a third processing unit adapted to determine the demand for calibration or reset based on a comparison of sensor data acquired in a defined manufacturing condition and further sensor data acquired during the manufacturing process, wherein the second processing unit and third processing unit can be the same or different processing units. Herein, the defined manufacturing condition can be part of a different manufacturing process of the same or a different product or a specific part of specific manufacturing process to be monitored. For example, a basic structure can be prepared besides the product to be produced in a powder bed and the corresponding sensor data be saved to be compared to sensor data in the middle or at the end of the manufacturing process.

Examples of sensors whose data might be secured that way are, for example, a temperature based sensor, for example, indirectly detecting the power output of a laser used in selective laser melting (SLM) or selective laser sintering, electron beam used in electron beam melting (EBM) or ray to cure a binder in binder jetting, a flowmeter measuring the real current applied to a component of a manufacturing device like a laser, the temperature of the material to be fused together before, during and/or after the fusion process, an optical sensor detecting the movement of a coating knife applying a new layer of material to be fused together or the quality of a distribution of a powder applied using such coating knife, or an optical sensor acquiring pictures during the manufacturing process.

The protection of the distributed database against manipulation can be realized using methods and means as available to a person skilled in the art. For example, said distributed database can be realized as blockchain to ensure that older data of the blockchain contained in earlier blocks is not manipulated by comparing the connection between older and newer blocks of the blockchain. Furthermore, the distributed database can be realized as encrypted database allowing new data to be added and old data to be retrieved only by a trusted party. Furthermore, it can be a peer-to-peer network allowing only access of specified persons and/or a correspondingly restricted access.

The term "processing unit" as used herein refers to data processing units as used for processing data. Herein, for example, checksums and cryptographic checksums are generated, smart contracts are executed, measured and predefined values are compared, a reaction to a specific situation is determined, an output is generated, a part of a data set is reconstructed, a checksum, preferably cryptographic checksum, is validated, new blocks for a blockchain are generated, new blocks are integrated in the blockchain, and so on. Such processing unit can, for example, be found in computers, clients, smart phones, and servers. For example, such processing units can also be found in knots of the distributed database like a blockchain.

According to another aspect the present invention refers a sensor unit comprising a sensor and a first processing unit, wherein the sensor and the first processing unit are inseparably connected, wherein the sensor unit is adapted to be used in an inventive sensor control assembly.

According to another aspect the present invention refers to a manufacturing device containing at least a part of an inventive sensor control, wherein the manufacturing device preferably is a manufacturing device for additive manufacturing. Typically, it is preferred that the manufacturing device contains at least the inventive sensor unit.

According to another aspect the present invention refers to a method for verifying and calibrating a sensor of an inventive sensor control assembly containing:—acquiring a first sensor data for a specific manufacturing condition and storing it in a data storage and/or distributed database,— acquiring a second sensor data of the sensor during the manufacturing process of the product,—calculating a cryptographic checksum of the sensor data using a first processing unit,—transmitting the second sensor data to the distributed database, wherein the distributed database is protected against manipulation,—verifying the second sensor data based on the cryptographic checksum,—determining a demand for calibration or reset of the sensor based on a comparison of the first sensor data and second sensor data, wherein a signal for calibration or reset of the sensor is generated if required. Herein, the aforementioned steps can, however, do not have to be performed in the specified order.

The term "manufacturing condition" as used herein refers to a specific state of utilizing the manufacturing device. This can be, for example, a melting process under specific conditions during a selective laser melting process or an interruption of the melting process during the application of a new powder layer during a selective laser melting process. Herein, for example, a temperature sensor is providing sensor data regarding the temperature of the surface of the powder material. This can also, for example, be a state of activity during an electron beam melting manufacturing process. Herein, a sensor monitors the power consumption of the electron beam source.

Such sensor data is, for example, acquired during a manufacturing process of a product using additive manufacturing. For example, it can also include information regarding the temperature of the manufacturing environment, interruptions of the manufacturing process, unplanned openings of the manufacturing device, currents like the adjusted current applied to a laser included in the manufacturing device and comparable information. Later on this data can be used to review the manufacturing process. For example, it can be checked whether all specifications were met during such manufacturing process. It was noted that such review is especially beneficial for sensor data acquired during such process. It is to be expected that such task becomes more and more important according to a more distributed production of corresponding products. In this context, it should be a very important topic for future production methods like additive manufacturing relying on a multitude of multipurpose devices automatically creating products at different sites. Although, the product should be expected to be the same it was noted that minor differences of the devices and specific parameters that might be included in the corresponding manufacturing process may result in grave differences of the product even possibly rendering it defective. Thus, such topic should become of high relevance of such application despite corresponding costs and additional work associated with it.

According to another aspect the present invention refers to a computer program product with program commands to perform an inventive method or to operate an inventive sensor assembly.

According to another aspect the present invention refers to a device for providing an inventive computer program product, wherein the device stores the computer program product and/or provides the computer program product for further use.

Unless specified otherwise terms like "calculate", "process", "determine", "generate", "configure", "reconstruct" and comparable terms refer to actions and/or processes and/or steps modifying data and/or creating data and/or converting data, wherein the data are presented as physical variable or are available as such.

The term "data storage" or comparable terms as used herein, for example, refer to a temporary data storage like RAM (Random Access Memory) or long term data storage like hard drives or data storage units like CDs, DVDs, USB sticks and the like. Such data storage can additionally include or be connected to a processing unit to allow a processing of the data stored on the data storage.

The term "smart contract" as used herein especially includes data like program data or data being able to be executed by a program to perform specified steps or actions including control commands, specified values, requirements, interrelated data like measured values and corresponding action in response to fulfilling or not fulfilling predefined values in comparison to said measured values. For example, executing the smart contract can be done by a correspondingly selected distributed database or a runtime environment like a virtual machine. Preferably, such means for executing the smart contract are turning complete. Typically, it is preferred that the smart contract is executed using the infrastructure of the distributed database.

The term "cryptographic checksum" as used herein refers to a data checksum preferably acquired using a cryptographic hash function on the corresponding data or a part of the corresponding data. Furthermore, it can especially refer to a digital signature or a cryptographic authentication code adapted to be used to verify data used to generate the cryptographic checksum to protect against manipulation. Herein, such cryptographic checksum can, for example, be provided for each sensor data acquired or for the complete monitored data. Providing a multitude of cryptographic checksum typically provided a higher protection against manipulation. Providing such cryptographic checksum for, for example, a complete block to be included in the distributed database typically reduces the required workload for the processing unit, but decreases the data security at least slightly.

The term "distributed database" as used herein refers to a decentralized database like a blockchain, a distributed ledger, a distributed data storage system, a distributed ledger technology based system, a manipulation proof database, a cloud, a cloud service, a blockchain in a cloud or a peer-to-peer database. Herein, such distributed database can be a public database like a public block chain or a non public database like a private block chain. Typically, it is preferred that such block chain is non public and can only be accessed by authorized persons. Herein, such access right might also be granted for external persons to allow a review of for example the production data of specific products.

The term "data block" as used herein refers to a block of a distributed database like a block chain or a peer-to-peer database. It may contain data regarding the size of the data block, a block header, a counter of monitored data, sensor data and/or monitored data. Said block header can, for example, contain a version number, a checksum, or a time stamp.

To simplify understanding of the present invention it is referred to the detailed description hereafter and the figures attached as well as their description. However, the invention is not to be understood being limited to the embodiments as disclosed on the detailed description as they represent embodiments providing additional benefits to solve specific problems or fulfilling specific needs. Also, the FIGURE is to be understood being not limiting the scope of the present invention, but disclosing a preferred embodiment explaining the invention further.

Figure 1:
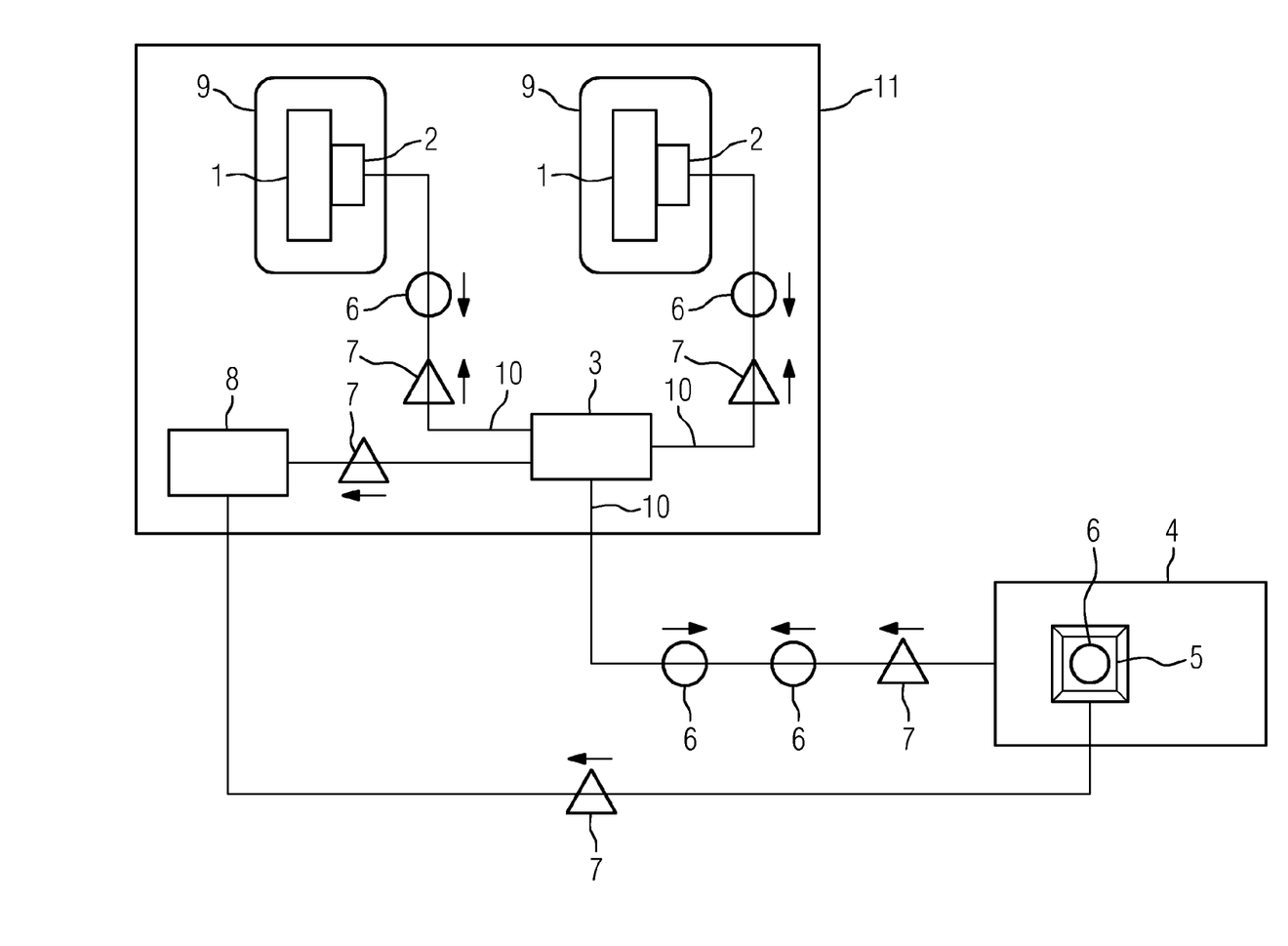
FIG. 1 shows a schematic drawing of an example of the inventive sensor control assembly.

FIG. 1 shows a schematic drawing of an example of the inventive sensor control assembly.

The embodiments hereafter contain, unless specified otherwise, at least one processor and/or data storage unit to implement the inventive method.

According to one aspect the present invention refers to a sensor control assembly to securely verify and calibrate a sensor of a manufacturing device utilized in a manufacturing process of a product, containing—a sensor of a manufacturing device,—a first processing unit adapted to provide a cryptographic checksum of sensor data acquired by the sensor,—a distributed database adapted to receive the sensor data,—a second processing unit adapted to verify the sensor data based on the cryptographic checksum,—a third processing unit adapted to determine the demand for calibration or reset based on a comparison of sensor data acquired in a defined manufacturing condition and further sensor data acquired during the manufacturing process, wherein the second processing unit and third processing unit can be the same or different processing units.

This surprisingly allows to directly generate a signal for calibration or reset of the sensor (1) in case a demand for calibration or reset of the sensor (1) based on a comparison of the first sensor data (6) and second sensor data (6) is determined. Herein, such calibration or reset can start immediately or delayed. However, it is not required to initiate a maintenance process, but the calibration or reset can take place automatically without further interaction required. This, for example, significantly reduces the work of an operator, increases the reliability and reduces the costs.

According to further embodiments such distributed database preferably provides a further encryption dividing the data contained therein into subsections. This allows to provide access to specific data for specific persons. It was noted that such method is very beneficial, for example, in case a costumer is granted the right to review the production data of a specific product, while the data regarding other products contained in the distributed database is to be kept secret. Alternatively or additionally the distributed database can be split into at least two sub databases, wherein these sub databases are split up according to, for example, different costumers, an official part and an unofficial part, or the like. For example, such official part can contain the sensor data of different layers of a product produced using additive manufacturing and the construction data of said product. While the inofficial part may contain the specific working conditions of an additive manufacturing device based on the construction data provided by a costumer and the internal know how to realize such structure.

According to further embodiments the first processing unit preferably is a hardware oracle, more preferred a blockchain chip. The term "hardware oracle" as used herein refers to a device containing security elements enabling the device using software security means like cryptographic methods, mechanical security means like lockable enclosing or electronical security means like means deleting the data of the device in case of tampering. Typically, it is preferred that such hardware oracle at least contains cryptographic keys. Typically, it is preferred that the processing unit of the sensor control assembly is a blockchain chip. It was noted that despite the higher costs and requirements resulting from this the possibility to encrypt the acquired data using hardware means proved to be especially beneficial. For example, it allows to securely provide a manipulation proof data set being a reliable source of data to be verified or used in later review processes of a manufacturing process.

According to further embodiments the first processing unit preferably is adapted to encrypt a first data set containing the cryptographic checksum and/or the sensor data, and wherein the distributed database or a data storage contained in the sensor control assembly is adapted to directly store the encrypted first data set or decrypt said first data set before it is stored in the data storage and/or the distributed database.

According to further embodiments the first processing unit is adapted to store the sensor data and the cryptographic checksum in the distributed database. Such direct storage reduces the number of possible points to intercept the data stream and possibly manipulate it.

According to further embodiments the sensor data, the cryptographic checksum or both preferably contain an unique identifier of the sensor. This allows to further increase the data security.

According to further embodiments it is preferred that the sensor data and the cryptographic checksum are stored in the distributed database. While it is possible to place the verification step of the sensor data in a data storage located, for example, in the manufacturing device and secure the data reliability using different means, it is typically preferred that the cryptographic checksum is also forwarded to the distributed database to allow another check based on this. Naturally, the communication between such data storage and the distributed database can be secured using additional means even when forwarding the cryptographic checksum in such case.

According to further embodiments the sensor control assembly preferably contains at least two, more preferred at least three, sensors. Typically, it is preferred that said sensors are different sensors like selected from the group consisting of optical temperature sensors, non-optical temperature sensors, sensors monitoring the current applied to a laser used in selective laser melting or a electron beam, cameras, sensors measuring the powder flow in the powder flow device, and weight sensors monitoring the weight of the powder bed. This allows to bundle multiple data in the secured data set allowing a more detailed review with ensured reliability.

According to further embodiments the sensor control assembly preferably contains at least one first processing unit being adapted to process the sensor data of at least two sensors. For example, this reduces the costs as the number of processing units is reduced. Such case is, for example, especially beneficial if an existing manufacturing device should be upgraded to enable it for the inventive method.

According to further embodiments the sensor control assembly preferably contains at least two sensors and at least two first processing units, and wherein at least one, more preferred at least two, even more preferred at least three, first processing units are adapted to process the sensor data of a single sensor. This typically allows a faster and more reliable processing. Especially, if the corresponding sensors are deemed to be of high importance for later review this can be very beneficial.

According to further embodiments the manufacturing device preferably contains a data storage located between the sensor and the distributed database. Such data storage can be used, for example to temporarily store the sensor data while the distributed database is not connected to the manufacturing device. Also it can be used to temporarily store commands send to the sensor. For example, it can be preferred to not directly execute a calibration or reset of the sensor. It was noted that direct execution of such commands during a manufacturing process can result in damages of the product. For example, the recalibration can be problematic in case said sensor is required for certain control features of the controls of the manufacturing device.

According to further embodiments the sensor and the first processing unit preferably are connected by a first connection, wherein the first connection is adapted to inseparably connect the sensor and the first processing unit. Preferably, the first connection is a direct connection like a cable connection from the sensor to the processing unit. Said first connection can also be a part of a circuit board, wherein on part of the circuit board is connected to or part of the sensor and a different part of the circuit board is connected to or part of the first processing unit. Typically, it is preferred that the first connection is adapted to provide a protection against manipulation of the data transferred from the sensor to the first processing unit. For example, the first connection and the interfaces to the sensor and the first processing unit can be enclosed by a casing, wherein said casing is preferably protected against manipulation.

According to further embodiments the sensor control assembly preferably contains a data storage, wherein the data storage is adapted to be consistently connected to first processing unit while the sensor is active, and wherein the data storage is adapted to at least temporarily store the sensor data and the cryptographic checksum. Typically, it is preferred that the data storage is part of the first processing unit. This enables to further increase the security of the data, as processing and storing the data acquired is highly localized at the sensor further decreasing the risk of manipulation of the data to be stored in the distributed database.

According to further embodiments the sensor control assembly preferably contains a second connection connecting the first processing unit and the distributed database, wherein a data storage is part of the second connection. Typically, it is preferred that the data storage is connected to at least two, more preferred at least three, first processing units. This provides, for example, the benefit that for embodiments providing a higher amount of sensor data said data can be stored centrally on such data storage. Also for embodiments, wherein a protected sensor unit comprising the sensor and the first processing unit and additionally a data storage is provided, including a greater data storage in such sensor unit results in increased costs. Storing the protected data on a central data storage, thus, can be beneficial for such cases too.

According to further embodiments the sensor control assembly preferably provides a first data storage being part of the first processing unit and a second data storage being part of the second connection. This provides, for example, the benefit that even systems providing a temporary connection to the distributed database can be realized without greater costs while keeping a higher level of security. While the primary protection of the sensor data is accomplished by the first data storage and, for example, bundled into small packages each protected the collected data is stored at least temporary on the second data storage until it can be stored in the distributed database. Such systems only require a small first data storage more securely protected, while the bigger amount of data is stored on the second data storage being more easily secured, as it is, for example, only used to collect the secured data intended to be introduced into the distributed database.

According to further embodiments the data storage, more preferred the first data storage and/or the second data storage, preferably is adapted to execute a smart contract based on the sensor data. This allows to immediately take action preventing, for example, unnecessary costs based on completing the production procedure of products also clearly being defective in the end. In this context, the data storage, more preferred the first data storage and/or the second data storage, can contain a separate processing unit, or can rely on, for example, the processing unit already available. For example, the smart contact can define thresholds for deviations detected by the comparison of the sensor data acquired in the defined manufacturing condition and the further sensor data acquired during the manufacturing process. For example, if a first threshold is violated the reset or calibration of the sensor can be triggered. For example, if a second threshold (e.g., a higher deviation is detected) is violated the manufacturing process is stopped. For this cases the smart contract can, for example, generate control messages or control transactions to preferably stop and inform the respective manufacturing devices that the manufacturing process needs to be interrupted or restarted. For example, based on the degree of the deviation it can be decided to generate control messages or transactions which will repair the manufactured product or to restart the manufacturing process to make a replacement for the damaged product. In other words, with these transactions or messages the manufacturing process can, for example, be reconfigured. For example, if the control transactions are used, these transactions can be stored in the distributed database and preferably the replication mechanisms of the distributed database transmit the transaction to the respective devices to stop, configure or restart the manufacturing process.

According to further embodiments the data storage, more preferred the first data storage and/or the second data storage, even more preferred the second data storage, preferably is adapted to verify the sensor data before transmission of the sensor data to the distributed database. Preferably, said verification is based on the cryptographic checksum.

According to further embodiments the data storage, more preferred the first data storage and/or the second data storage, even more preferred the second data storage, preferably is adapted to provide blocks containing the cryptographic checksum, more preferred that cryptographic checksum and the monitored data, adapted to be included in the distributed database.

According to further embodiments the second connection preferably is adapted to consistently connect the first processing unit and the distributed database at least when the sensor is generating sensor data. This, for example, allows to directly store the collected sensor data further improving the data security.

According to further embodiments the data storage, more preferred the first data storage and/or the second data storage, even more preferred the second data storage, preferably is not consistently connected to the distributed database when the sensor is generating sensor data. Herein, the connection of the data storage and the distributed database can be either only temporarily when the sensor is generating sensor data or even not at all. For example, the data can also be transferred from the data storage to the distributed database batchwise like using a USB stick or connecting regularly using a wireless connection.

According to further embodiments the first connection preferably is secured, preferably using a security casing adapted to prevent a manipulation of a data stream between the sensor and the first processing unit. Typically, it is preferred that the first connection and the connection to the optional data storage is secured in such way. For example, such security encasing can provide a mechanism rendering the encryption device hardware defective upon trying to open the security encasing. Typically, it is preferred that the sensor is enclosed in such security encasing to allow only the replacement of the whole unit containing the sensor and the encryption device hardware to avoid connecting some manipulated encryption device hardware in between.

According to further embodiments the distributed database preferably contains a blockchain and/or a peer-to-peer data bank system, more preferred a blockchain. These kinds of distributed databases are especially beneficial for typical applications.

According to further embodiments the distributed database preferably additionally contains a data prioritization unit adapted calculate a priority based on the sensor data, and wherein the priority is stored in the sensor data or along the sensor data. This, for example, can be used to prioritize the processing of the sensor data by the distributed database. For example, if sensor data with high priority should be stored in the distributed database system, the difficulty of a cryptographic puzzle is adapted to speed up the validation and storing process. This, for example, can be beneficial in cases where the sensor data indicate an event (e.g., a malfunction of a/the manufacturing device) which needs preferably taken care of as fast as possible. Additionally or alternatively the distributed database system adjusts the transmission speed of the sensor data within the network of nodes of the distributed database system based on the priority. This, for example, can be beneficial in cases where the sensor data needs to be rapidly transmitted to a specific node of the distributed database system. The specific node is, for example, a specific processing node for high priority sensor data which is capable to shut down the manufacturing device and/or manufacturing process to avoid damage of the manufactured product or the manufacturing device/system.

According to another aspect the present invention refers to a sensor unit comprising a sensor and a first processing unit, wherein the sensor and the first processing unit are inseparably connected, wherein the sensor unit is adapted to be used in an inventive sensor control assembly.

According to further embodiments the sensor unit preferably is protected against tampering as a whole. For example, said sensor unit can be provided as encased unit, wherein opening encased unit at least without fulfilling specific requirements like electronic or physical keys result in a partial or complete deletion of the data contained therein. Additionally or alternatively such process as opening such casing can be detected to be recorded or directly transmitted to the distributed database.

According to further embodiments the sensor unit preferably contains the data storage. This allows, for example, to exchange this complete part of the assembly being a core part of the security as a whole during a maintenance to decrease the chance of manipulation.

According to another aspect the present invention preferably refers to a manufacturing device containing at least a part of an inventive sensor control assembly, wherein the manufacturing device preferably is a manufacturing device for additive manufacturing. Typically, it is preferred that the manufacturing device contains at least the sensor, more preferred the sensor and the processing unit, even more preferred the sensor control assembly besides the distributed data storage and a part of second connection adapted to at least temporarily connect the processing unit and the distributed database. Directly providing complete manufacturing devices containing such system, for example, simplifies the integration in an existing fleet or that the costumer ordering some product can rely on certain standards to be met.

According to further embodiments the manufacturing device preferably is an additive manufacturing device, preferably a 3D-printer. Typically, it is preferred that the additive manufacturing device uses selective laser melting, selective laser sintering, electron beam melting or binder jetting, more preferred selective laser melting or electron beam melting. These types of devices have a high potential and possibility of flexible production, but also suffer easily from slight deviation during the manufacturing process.

According to further embodiments the device preferably contains an encryption device hardware, preferably a block chain chip, adapted to create the cryptographic checksum. Directly including such specialized hardware, for example, further increases the security and reliability.

According to further embodiments the manufacturing device preferably contains a wireless connection device. Typically, it is preferred that the wireless connection device is part of a second connection to connect the processing unit and the distributed database. Said wireless connection device can be, for example, adapted to wirelessly connect to an interface being itself connected to a computer, a data storage or a network. For example, the computer or data storage can be part of the distributed database or the network can be connected to the distributed database.

According to further embodiments the manufacturing device preferably contains a data storage adapted to be consistently connected to the first processing unit while the sensor is active and adapted to at least temporarily store the monitored data and/or sensor data and the cryptographic checksum. Said data storage can also be adapted to store at least a part of the monitored data and/or sensor data like the cryptographic checksums for long term. This, for example, allows to review this data later and compare it with the data of the distributed database.

According to further embodiments the manufacturing device preferably contains a first interface adapted to transmit data containing the monitored data and/or the cryptographic checksum to a transport medium. Examples of such transport medium are USB sticks, CDs, DVDs or comparable media. Typically, it is preferred that the data is stored on the transport medium in encrypted form. In this context, it is preferred that the interface contains or is connected to a device encrypting the data to be stored on the transport medium. The use of such transport medium provides the possibility to prevent a consistent connection of the manufacturing devices to a central network being a possible target of cyberattacks. Herein, the acquired data can be transported batchwise to the distributed database. Such interface can also be part of an alternative second connection to allow an acquisition of the corresponding data even if the primary second connection is damaged.

According to further embodiments the sensor data and/or the cryptographic checksum preferably contains a unique identifier of the manufacturing device. This allows to further increase the security. For example, this also allows to directly associate specific data to a specific sensor even in case the sensor had to be replaced at an unknown time by the operator of the manufacturing device. Also this can trigger some process to reevaluate whether the first sensor data can still be used or new first sensor is required.

According to further embodiments the manufacturing device preferably contains at least one, more preferred at least two, even more preferred at least three, inventive sensor units.

According to another aspect the present invention refers to a method for verifying and calibrating a sensor of an inventive sensor control assembly providing a containing:—acquiring a first sensor data for a specific manufacturing condition and storing it in a data storage and/or distributed database,—acquiring a second sensor data of the sensor during the manufacturing process of the product,—calculating a cryptographic checksum of the sensor data using a first processing unit,—transmitting the second sensor data and the cryptographic checksum to the data storage or the distributed database,—verifying the second sensor data based on the cryptographic checksum,—determining a demand for calibration or reset of the sensor based on a comparison of the first sensor data and second sensor data, wherein a signal for calibration or reset of the sensor is generated if required.

According to further embodiments the steps preferably are applied to at least two, more preferred at least three, sensors. This, for example, provides a more detailed data set being available for later reviews.

According to further embodiments the sensor data or the cryptographic checksum preferably contains at least one unique identifier of the sensor or the manufacturing device. This, for example, provides additional means to increase the data security and allows to decrease the chance of incorrect correlations of first sensor data and second sensor data, for example, in case additional inventive sensor units are integrated into an inventive manufacturing device later on.

According to further embodiments the sensor data and the cryptographic checksum preferably are stored in the distributed database as blocks, wherein the blocks are interconnected, preferably using a cryptographic hash function. This allows to further increase the data security, even if the blocks are, for example, stored on servers possibly being a point of cyberattacks and tries to manipulate the data. Typically, it is preferred that such blocks are part of a blockchain.

According to further embodiments calculating a cryptographic checksum of the sensor data preferably is performed using an encryption device hardware, preferably a blockchain chip. Using such specialized hardware, for example, increases the speed and typically also the security.

According to further embodiments the sensor data and/or the cryptographic checksum preferably are encrypted before they are sent to the distributed database. Typically, it is preferred that they are encrypted before leaving the manufacturing device. Herein, the monitored data and the cryptographic checksum can be encrypted together or separately, preferably together. This, for examples, further increases the data security.

According to further embodiments the method preferably is adapted to provide an essentially regular data stream of the sensor, preferably wherein irregularities of the data stream trigger a predefined action like a corresponding signal, a corresponding notification in the data storage or stopping the current production. Herein, such predefined action and its trigger can be specified, for example, by a smart contract stored in, for example, the distributed database like a blockchain. Herein, an incoming block containing new monitored data can, for example, trigger an evaluation based on such smart contract to identify whether the specified restrictions are met and a certain action has to be triggered. Herein, such action not necessarily lead to, for example, an abortion of a manufacturing process, but can also simply provide a signal or flag for some supervisor or controller to review the process immediately or after the manufacturing process in finished.

Typically, it is preferred that the method preferably is further adapted to differentiate between different intervals of the production to, for example, specify critical phases of the production, wherein interruption is not acceptable, and non critical phases of the production, wherein interruption can be tolerated. This can be, for example used to stop a production in case such interruption leads to a defective product, while the production is maintained in case the product does not suffer from such interruption. This can also be used in case multiple products are produced in multiple layers, wherein the manufacturing device is stopped between two layers of products resulting in no defective products. In this context, different actions can preferably be selected for different productions and different parts of one production cycle.

The phrase "essentially regular data stream" as used herein refers to a data stream having a predefined time interval for providing new data like the monitoring data and the cryptographic checksum for the distributed database. Herein, it is referred to the real time and not the time of providing the data to the distributed database. Especially, if the sensor control assembly is not directly and consistently connected to the distributed database during the time of activity of the sensor, the acquired monitored data and/or sensor data can be temporarily stored in a data storage to collect the data until the next block or block are sent to the distributed database. Herein, a smart contract contained in the distributed database can also be downloaded to the data storage to provide the possibility to consistently perform checks and reviews based on such smart contract even at times when there is temporarily no connection to the distributed database.

According to further embodiments predefined sensor data preferably triggers a predefined action, preferably wherein the method is used for a manufacturing process using a manufacturing device, wherein the predefined sensor data monitors the manufacturing process, and wherein the predefined action influences or stops the manufacturing process, provides a signal to the personal supervising the manufacturing device and/or generates additional data to be included in or attached to the monitored data. Herein, it is typically preferred that a smart contract is used.

According to further embodiments a smart contract preferably is used to control the predefined action triggered by the predefined sensor data, wherein preferably the smart contract is stored in the distributed database.

According to a further aspect the present invention preferably refers to a computer program product with program commands to perform a method as disclosed herein or to operate a sensor assembly as disclosed herein.

According to a further aspect the present invention preferably refers to a device for providing a computer program product as disclosed herein.

Hereafter the invention is described based on a specific example as shown in the FIGURE. Herein, it is to be understood that said FIGURE is only meant for the purpose to illustrate the invention and not to restrict the scope claimed herein. Said scope is only limited by the claims as attached hereto.

DETAILED DESCRIPTION OF INVENTION

Herein, the two sensors 1 are embedded in a 3D-printing device being an example of the manufacturing device 11 used in the manufacturing process of a product. A first processing unit 2 being a hardware oracle is connected to each sensor 1 providing a cryptographic checksum of sensor data 6 which in turn is being forwarded to a local data storage 3 located in the manufacturing device 11. Herein, said sensor 1 and first processing unit 2 are enclosed in a security casing 9 preventing a manipulation resulting in a inseparable connection of the sensor 1 and the first processing unit 2.

Here, the sensor data 6 being accompanied by a unique identifier can be verified based on the cryptographic checksum for a first time, before it is sent to the distributed database 4 also containing a second processing unit where it is checked again. Also commands 7 originating in the distributed database 4 regarding calibration or reset of the sensor 1 can also be temporarily stored on the data storage 3 until a predefined status of the manufacturing device 11 is reached. For example, such commands 7 can be postponed until the manufacturing process of the present product is finished.

Furthermore, the first processing units 2 contain a prioritization unit adapted calculate a priority based on the sensor data 6. For example, in case a predefined case arises said prioritization unit provide a priority being forwarded to the data storage 3 to trigger a faster processing of said data. This allows to greatly increase the speed of the reaction triggered, for example, by a smart contract 5 contained in the data storage 3 to prevent damages or dangers resulting from abnormal conditions.

The second processing unit of the distributed database 4 also fulfills the function of the third processing unit and determines whether a calibration or reset of the sensor 1 is required. This review is based on a smart contract 5 laid down in the distributed database 4 specifying the type of review and its conditions. Based on said review the distributed database 4 can create a command 7 being sent to the sensors 1 to initiate such calibration or reset process.

However, in case of the example as shown in FIG. 1 the data storage 3 located in the manufacturing device 11 also contains a smart contract 5 to check the sensor data 6 in case the connection to the distributed database 4 is interrupted. When connecting back to the distributed database 4 the data storage 3 preferably not only sends the collected sensor data 6, but also data regarding the smart contracts 5 executed in the meantime to be stored and/or checked in the distributed database 4. Also in such case the distributed database 4 preferably sends available updated data to the data storage 3 regarding, for example, updated review conditions, new or corrected smart contracts 5, or the like. In case the first sensor data 6 used to evaluate is not available on the data storage 3 as, for example, the data storage 3 has been reset or the data stored on the data storage 3 has been corrupted said first sensor data 6 can also be downloaded from the distributed database 4. This can also be used to transfer such first sensor data 6 to other identical manufacturing devices 11 allowing to reduce the number of required steps to perform the inventive method on each manufacturing device 11. In such case the production can directly start by collecting the second sensor data 6 of the production of a product.

While the distributed database 4 also has the function to execute smart contracts 5, take decisions and send commands 7 the sensors 1 and/or the manufacturing device 11 its main function is to store the acquired data in a manipulation proof way. In this case the distributed database 4 is a blockchain storing the sensor data 6 and other corresponding data in blocks of said blockchain being connected to each other to prevent a manipulation of such data stored therein. The data exchange between the sensors 1 and/or the data storage 3 and the distributed database 4 can be ensured by various means. A cryptographic checksum can be generated to detect manipulation. However, the data exchange can also be, for example, encrypted to prevent a manipulation.

In the example as shown the data storage 3 and the distributed database 4 are furthermore adapted to send commands 7 to the controls 8 of the manufacturing device 11. For example, if specific sensor data 6 is acquired indication a grave problem or even danger risking damages or even injuries of the operators working on the manufacturing device 11 such commands 7 and trigger signals to inform the operator or even stop the manufacturing.

The present invention was only described in further detail for explanatory purposes. However, the invention is not to be understood being limited to these embodiments as they represent embodiments providing benefits to solve specific problems or fulfilling specific needs. The scope of the protection should be understood to be only limited by the claims attached.

The invention claimed is:

1. A sensor control assembly to securely verify and calibrate a sensor of a manufacturing device utilized in a manufacturing process of a product, comprising:
   a sensor of a manufacturing device,
   a first processing unit adapted to provide a cryptographic checksum of first sensor data acquired by the sensor,
   a distributed database adapted to receive the first sensor data, wherein the distributed database is protected against manipulation,
   a second processing unit adapted to verify the first sensor data based on the cryptographic checksum,
   a third processing unit adapted to determine a demand for calibration or reset based on a comparison of second sensor data acquired in a defined manufacturing condition and the first sensor data acquired during the manufacturing process,
   wherein the second processing unit and third processing unit can be the same or different processing units;
   wherein the distributed database or a data storage contained in the manufacturing device is adapted to execute a smart contract based on the sensor data;
   wherein the smart contract defines one or more thresholds for a deviation detected by comparing the first sensor data with the second sensor data; and
   wherein a calibration or a reset of the sensor is triggered in the event that a first threshold value of the one or more thresholds of the smart contract is exceeded by the deviation.

2. The sensor control assembly according to claim 1, wherein the sensor control assembly is adapted to generate a signal for calibration or reset of the sensor in case a demand for calibration or reset of the sensor based on the deviation exceeding the first threshold value.

3. The sensor control assembly according to claim 1, wherein the first processing unit is a hardware oracle and/or wherein the distributed database contains a blockchain and/or a peer-to-peer data bank system.

4. The sensor control assembly according to claim 1, wherein the first sensor data, the cryptographic checksum, or both contain a unique identifier of the sensor.

5. The sensor control assembly according to claim 1, further comprising:
a data prioritization unit adapted calculate a priority based on the first sensor data, and
wherein the priority is stored in or along the first sensor data.

6. A sensor unit comprising:
a sensor, and
a first processing unit,
wherein the sensor and the first processing unit are inseparably connected,
wherein the sensor unit is adapted to be used in the sensor control assembly according to claim 1.

7. A manufacturing device comprising:
at least a part of the sensor control assembly according to claim 1.

8. The manufacturing device according to claim 7, wherein the manufacturing device contains the data storage located between the sensor and the distributed database.

9. The manufacturing device according to claim 7, wherein the manufacturing device is a manufacturing device for additive manufacturing.

10. A method for verifying and calibrating a sensor of a sensor control assembly to securely verify and calibrate a sensor of a manufacturing device utilized in a manufacturing process of a product, the sensor control assembly including a sensor of a manufacturing device, a first processing unit adapted to provide a cryptographic checksum of first sensor data acquired by the sensor, a distributed database adapted to receive the first sensor data wherein the distributed database is protected against manipulation, a second processing unit adapted to verify the first sensor data based on the cryptographic checksum, a third processing unit adapted to determine the demand for calibration or reset based on a comparison of second sensor data acquired in a defined manufacturing condition and the first sensor data acquired during the manufacturing process, wherein the second processing unit and third processing unit can be the same or different processing units, the method comprising:

acquiring the second sensor data for a specific manufacturing condition and storing it in thea data storage and/or the distributed database, acquiring the first sensor data of the sensor during the manufacturing process of the product, calculating a cryptographic checksum of the first sensor data using a first processing unit, transmitting the first sensor data and the cryptographic checksum to the data storage or the distributed database, verifying the first sensor data based on the cryptographic checksum, determining a demand for calibration or reset of the sensor based on the comparing of the first sensor data and second sensor data, wherein a signal for the calibration or the reset of the sensor is generated if required.

11. The method according to claim 10, wherein calculating a cryptographic checksum of the first sensor data is performed using an encryption device hardware.

12. The method according to claim 11, wherein calculating a cryptographic checksum of the first sensor data is performed using a hardware oracle.

13. The method according to claim 11, wherein calculating a cryptographic checksum of the first sensor data is performed using a blockchain chip.

14. The method according to claim 10, wherein predefined sensor data triggers a predefined action.

15. The method according to claim 14,
wherein the method is used for a manufacturing process using a manufacturing device,
wherein the predefined sensor data monitors the manufacturing process, and
wherein the predefined action influences or stops the manufacturing process, provides a signal to personal supervising the manufacturing device and/or generates additional data to be included in or attached to the sensor data.

16. A non-transitory computer readable media, comprising:
program commands stored thereon and adapted to perform the method according to claim 10.

* * * * *